United States Patent
Tanglertsampan et al.

(10) Patent No.: US 11,663,246 B2
(45) Date of Patent: May 30, 2023

(54) SYSTEMS AND METHODS TO PROVIDE LOCAL SUGGESTIONS BASED ON SPECTRAL CLUSTERING

(71) Applicant: META PLATFORMS, INC., Menlo Park, CA (US)

(72) Inventors: Apaorn Tanglertsampan, Seattle, WA (US); Jason Eric Brewer, Kirkland, WA (US); Bradley Ray Green, Snohomish, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 1002 days.

(21) Appl. No.: 15/376,287

(22) Filed: Dec. 12, 2016

(65) Prior Publication Data

US 2018/0165302 A1   Jun. 14, 2018

(51) Int. Cl.
*G06F 16/9537*    (2019.01)
*H04L 67/52*     (2022.01)
*G06F 16/29*     (2019.01)

(52) U.S. Cl.
CPC .......... *G06F 16/29* (2019.01); *G06F 16/9537* (2019.01); *H04L 67/52* (2022.05)

(58) Field of Classification Search
CPC ...... G06F 16/29; G06F 16/387; G06F 16/487; G06F 16/587; G06F 16/687; G06F 16/909; G06F 16/9537; H04L 67/18; H04L 67/52
See application file for complete search history.

(56) References Cited

U.S. PATENT DOCUMENTS

| | | | | |
|---|---|---|---|---|
| 8,660,358 | B1* | 2/2014 | Bergboer | G06T 11/60 382/190 |
| 2010/0049696 | A1* | 2/2010 | Lokshin | G06F 16/29 701/533 |
| 2012/0290652 | A1* | 11/2012 | Boskovic | G06Q 50/30 709/204 |
| 2013/0006515 | A1* | 1/2013 | Vellaikal | G01C 21/3679 701/410 |
| 2013/0345969 | A1* | 12/2013 | Udeshi | G01C 21/30 701/461 |
| 2014/0129553 | A1* | 5/2014 | Sankar | G06F 16/9537 707/724 |

(Continued)

OTHER PUBLICATIONS

Jarvis et al., "Clustering Using a Similarity Measure Based on Shared Near Neighbors," Nov. 1973, IEEE Transactions on Computers, vol. C-22, No. 11, pp. 1025-1034. (Year: 1973).*

(Continued)

*Primary Examiner* — Etienne P Leroux
*Assistant Examiner* — Dara J Glasser
(74) *Attorney, Agent, or Firm* — Sheppard Mullin Richter & Hampton LLP (57) ABSTRACT

Systems, methods, and non-transitory computer readable media are configured to apply a spectral clustering technique to at least a portion of a similarity graph to generate clusters of geographic sub-regions constituting geographic regions. A tf-idf technique is performed to determine pages of a social networking system associated with a geographic region as potential local suggestions for a user associated with a geographic sub-region in the geographic region. References to at least a portion of the pages are presented as local suggestions to the user.

20 Claims, 7 Drawing Sheets

(56) References Cited

U.S. PATENT DOCUMENTS

| | | | | |
|---|---|---|---|---|
| 2015/0003652 A1* | 1/2015 | Bisgaard | ................ | H04R 25/50 |
| | | | | 381/314 |
| 2015/0169629 A1* | 6/2015 | van Dijk | ................ | H04L 67/20 |
| | | | | 707/724 |
| 2015/0356183 A1* | 12/2015 | Green | ................ | G06F 16/9535 |
| | | | | 707/724 |
| 2018/0095977 A1* | 4/2018 | Reddy | ................ | G06F 16/9535 |

OTHER PUBLICATIONS

Hu et al. "Clustering Algorithm Based on Mutual K-Nearest Neighbor Relationships," Feb. 9, 2012, Wiley Online Library, pp. 100-113. (Year: 2012).*

* cited by examiner

```
┌─────────────────────────────────────────────────────────────────────────┐
│ Apply a spectral clustering technique to at least a portion of a        │
│ similarity graph to generate clusters of geographic sub-regions         │
│ constituting geographic regions                                         │
│                                   402                                   │
└─────────────────────────────────────────────────────────────────────────┘
                                     │
                                     ▼
┌─────────────────────────────────────────────────────────────────────────┐
│ Perform a tf-idf technique to determine pages of a social networking    │
│ system associated with a geographic region as potential local           │
│ suggestions for a user associated with a geographic sub-region in       │
│ the geographic region                                                   │
│                                   404                                   │
└─────────────────────────────────────────────────────────────────────────┘
                                     │
                                     ▼
┌─────────────────────────────────────────────────────────────────────────┐
│ Present references to at least a portion of the pages as local          │
│ suggestions to the user                                                 │
│                                   406                                   │
└─────────────────────────────────────────────────────────────────────────┘
```

SYSTEMS AND METHODS TO PROVIDE LOCAL SUGGESTIONS BASED ON SPECTRAL CLUSTERING

FIELD OF THE INVENTION

The present technology relates to the field of content provision. More particularly, the present technology relates to techniques for recommending content items.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that would also be of interest to the user. Providing such additional content items can enhance the user experience and may help realize the full potential of the social network.

SUMMARY

Various embodiments of the present technology can include systems, methods, and non-transitory computer readable media configured to apply a spectral clustering technique to at least a portion of a similarity graph to generate clusters of geographic sub-regions constituting geographic regions. A tf-idf technique is performed to determine pages of a social networking system associated with a geographic region as potential local suggestions for a user associated with a geographic sub-region in the geographic region. References to at least a portion of the pages are presented as local suggestions to the user.

In an embodiment, the geographic sub-regions are cities and the geographic regions are metropolitan areas including the cities.

In an embodiment, two geographic sub-regions are linked through a connection based on at least one of a first condition relating to whether the two geographic sub-regions are within a selected radius of one another and a second condition relating to whether the two geographic sub-regions are within a selected number of nearest cities of one another.

In an embodiment, the connection is weighted based on at least one of check-ins by users in the two geographic sub-regions and a distance between the two geographic sub-regions.

In an embodiment, the similarity graph is partitioned by country.

In an embodiment, the geographic regions correspond to documents, pages relating to a geographic region correspond to terms in a document, and a number of users who like a page correspond to term frequency in the tf-idf technique.

In an embodiment, the performing a tf-idf technique comprises normalizing a tf term by $m_f$, where $m_f$ is a maximum number of likes by users in a metropolitan area for a page over all pages in the metropolitan area.

In an embodiment, the performing a tf-idf technique comprises adjusting a value of a constant k to tune a ratio between a number of relatively small pages and a number of relatively large pages in the pages.

In an embodiment, the performing a tf-idf technique comprises counting only metropolitan areas in which a number of users who like a page satisfies a selected threshold amount for $n_p$, where $n_p$ is a number of metropolitan areas with users who like a page.

In an embodiment, at least one condition relating to a desired degree of locality of a page in relation to a city is applied to the pages to determine the at least a portion of the pages for which the references are presented as local suggestions to the user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Local Suggestions Based on Spectral Clustering

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

As referenced, under conventional approaches, a user may navigate to or be presented with various content items provided through a social networking system. The content items can come from pages associated with members of the social networking system. The content items can be identified based on conventional computerized techniques designed to match interests of the user with relevant content items. Providing content items of interest to the user can enhance user experience and accordingly help realize the full potential of the social networking system. However, conventional computerized techniques often cannot reliably identify quality content items of interest to the user. In many instances, even when they can identify some content items of interest to the user, conventional computerized techniques may identify only a portion of a full spectrum of content items that are potentially relevant to the user. As a result, user experience with the social networking system can suffer. This failure can be especially problematic as the membership size of the social networking system increases and the number of available content items to consider likewise increases.

An improved approach rooted in computer technology overcomes the foregoing and other disadvantages associated with conventional approaches specifically arising in the realm of computer technology. Systems, methods, and computer readable media of the present technology can construct a similarity graph of cities and cluster the cities into metropolitan (metro) areas. Two cities can be linked by a connection in the similarity graph based on conditions relating to a radial distance between the two cities and a selected nearest neighbor relationship. The constructed similarity graph can be partitioned into subgraphs by country. Spectral clustering can be applied to each subgraph. Resulting clustering can generate metropolitan areas. A tf-idf technique is performed in which metropolitan areas are documents, pages fanned by users in metro areas are terms in the documents, and a number of users that like a page are term frequency. Based on the tf-idf technique, a set of important pages for each metropolitan area can be determined. Pages in the set of important pages that do not satisfy one or more locality conditions can be filtered out. Remaining pages in the set of important pages, or references thereto, can be used in recommendations presented as content items of interest to a user associated with a city in a corresponding metropolitan area. More details regarding the present technology are described herein.

Figure 1:
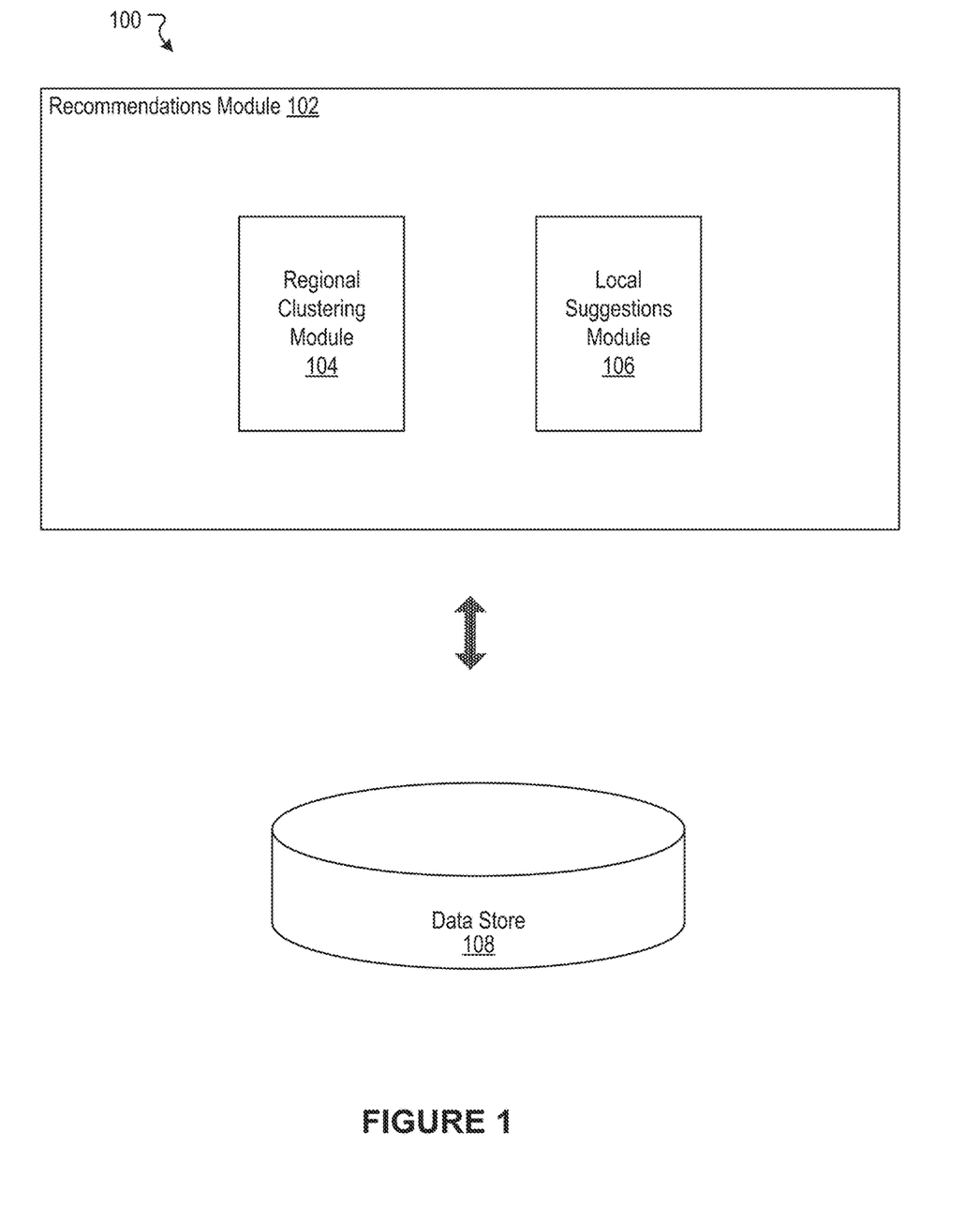
FIG. 1 illustrates a system including an example recommendation module, according to an embodiment of the present technology.

FIG. 1 illustrates an example system 100 including an example recommendations module 102 configured to determine local suggestions for a geographic region for presentation to a user of a social networking system, according to an embodiment of the present technology. In some embodiments, the recommendations module 102 can determine various types of information associated with members of a social networking system as the local suggestions. In one example, the types of information can include pages (or profiles) or other content items associated with members of the social networking system. In some embodiments, the geographic region can be any regional classification or category and the geographic region can include geographic sub-regions. In one example, the geographic regions can be metropolitan areas and the geographic sub-regions can be cities in the geographic regions.

The embodiments of the present technology discussed herein are non-limiting examples. While some embodiments discussed herein relate to pages of a social networking system as local suggestions, the present technology can apply to other types of information constituting local suggestions in other embodiments. For example, the present technology can determine advertisements targeted for a geographic region as local suggestions for users in the geographic region. As another example, the present technology can determine events for a geographic region as local suggestions for users in the geographic region. As yet another example, the present technology can determine local interests, trending local news or alerts, and the like as local suggestions for users in the geographic region. Further, while some embodiments discussed herein relate to a metropolitan area as a type of geographic region with which local suggestions are associated, the present technology can apply to other types and levels of geographic regions apart from metropolitan areas. Many variations are possible.

The recommendations module 102 can include a regional clustering module 104 and a local suggestions module 106. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the recommendations module 102 can be implemented in any suitable combinations.

The regional clustering module 104 can construct a similarity graph to cluster geographic sub-regions, such as cities, into geographic regions, such as metropolitan areas, based on spectral clustering. The regional clustering module 104 can construct a similarity graph where cities in a geographic area, such as a country, are vertices in the similarity graph. To model local area relationships among cities in the geographic area, the regional clustering module 104 can create a connection (or edge) between two cities to link the two cities upon satisfaction of one or more conditions (or thresholds, rules).

In some embodiments, the conditions to be satisfied for creation of a connection between two cities can include a first condition relating to whether the two cities are within a selected radius of one another and a second condition relating to whether the two cities are within a selected number of nearest cities of one another. With respect to the first condition, a distance between two cities can be calculated in a variety of ways. In some embodiments, an average value of latitude and an average value of longitude for each city can be determined and a distance between the two cities can be determined based on their average values of latitude and longitude. In one example, the average values of latitude and longitude for a city can be based on respective locations of users in the city as indicated through, for example, check-ins by the users with a social networking system. The selected radius can be based on a country in which the two cities are located. In some embodiments, the selected radius can be based on, for example, the geographic size of the country or the availability of transportation systems to traverse the country. For example, the value of a selected radius for a country can be proportional to or otherwise correlate with the geographic size of the country or the extent to which transportation systems are available to traverse the country, or both. With respect to the second condition, a first list of a selected number of cities nearest to a first city of the two cities can be determined. Likewise, a second list of a selected number of cities nearest to a second city of the two cities can be determined. If the second city appears in the first list and the first city appears in the second list, the second condition is satisfied. In some embodiments, the selected number of cities can be any suitable value. In one implementation, the selected number of cities can be 100.

Each connection between a first city and a second city can be associated with a weight. A weight for a connection can be a product of two factors: a first factor relating to distance between two cities d and a second factor relating to user check-ins behavior u. The distance between two cities d can be determined from the following equation:

$$d = e^{\frac{-d_{AB}^2}{2\sigma^2}}, \quad (1)$$

where $d_{AB}$ is a distance between cities A and B and $\sigma$ is a sample variance of distances between cities in an associated country. The user check-ins behavior u can be determined from the following equation:

$$u = \frac{n}{t_A^{(1-p)} t_B^p}, \quad (2)$$

where n is a number of user check-ins in a first city and a second city, $t_x$ is a total number of user check-ins in city X, and p is a constant value less than 0.5 if $t_A < t_B$. In some embodiments, the user check-ins behavior u can constitute a type of modified cosine similarity relating to user check-in behavior. In some embodiments, p can be adjusted based on relative sizes of the cities.

A similarity graph can be constructed based on connections between cities and a weight associated with each connection, as described herein. The similarity graph can be partitioned by country into subgraphs to increase efficiency and accuracy in generation of metropolitan areas. Spectral clustering can be applied to each subgraph to generate resulting clusters, which constitute metropolitan areas. In some embodiments, various techniques can be applied to reduce any overlap between clusters. Each cluster can include one or more cities. In some embodiments, each cluster can be labeled with the biggest city within the cluster. More details regarding the regional clustering module 104 are discussed in connection with FIG. 3 below.

The local suggestions module 106 can provide pages as local suggestions to a user based on a metropolitan area including a city associated with the user. A social networking system may provide pages of various entities. For example, pages may be associated with companies, businesses, brands, products, artists, public figures, entertainment, individuals, and other types of entities. The pages can be dedicated locations on the social networking system to reflect the presence of the entities on the social networking system. The pages can publish content that is deemed relevant to the associated entities to promote interaction with the pages. Interaction with the pages can involve users visiting pages, accessing content published by the pages, sending messages to the pages, commenting on content on the pages, etc. Relevant or important pages for each metropolitan area in a geographic area can be identified by a tf-idf technique. Post-filtering can be performed on the pages to increase their locality in relation to the city associated with the user. Pages that satisfy one or more conditions relating to locality can be provided as local suggestions by a social networking system to the user. The local suggestions module 106 is described in more detail herein.

In some embodiments, the recommendations module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the recommendations module 102 can be, in part or in whole, implemented as software running on one or more computing devices or systems, such as on a server or a client computing device. For example, the recommendations module 102 can be, in part or in whole, implemented within or configured to operate in conjunction or be integrated with a social networking system (or service), such as a social networking system 630 of FIG. 6. As another example, the recommendations module 102 can be implemented as or within a dedicated application (e.g., app), a program, or an applet running on a user computing device or client computing system. In some instances, the recommendations module 102 can be, in part or in whole, implemented within or configured to operate in conjunction or be integrated with client computing device, such as a user device 610 of FIG. 6. It should be understood that many variations are possible.

The system 100 can include a data store 108 configured to store and maintain various types of data, such as the data relating to support of and operation of the recommendations module 102. The data store 108 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the recommendations module 102 can be configured to communicate and/or operate with the data store 108.

Figure 2:
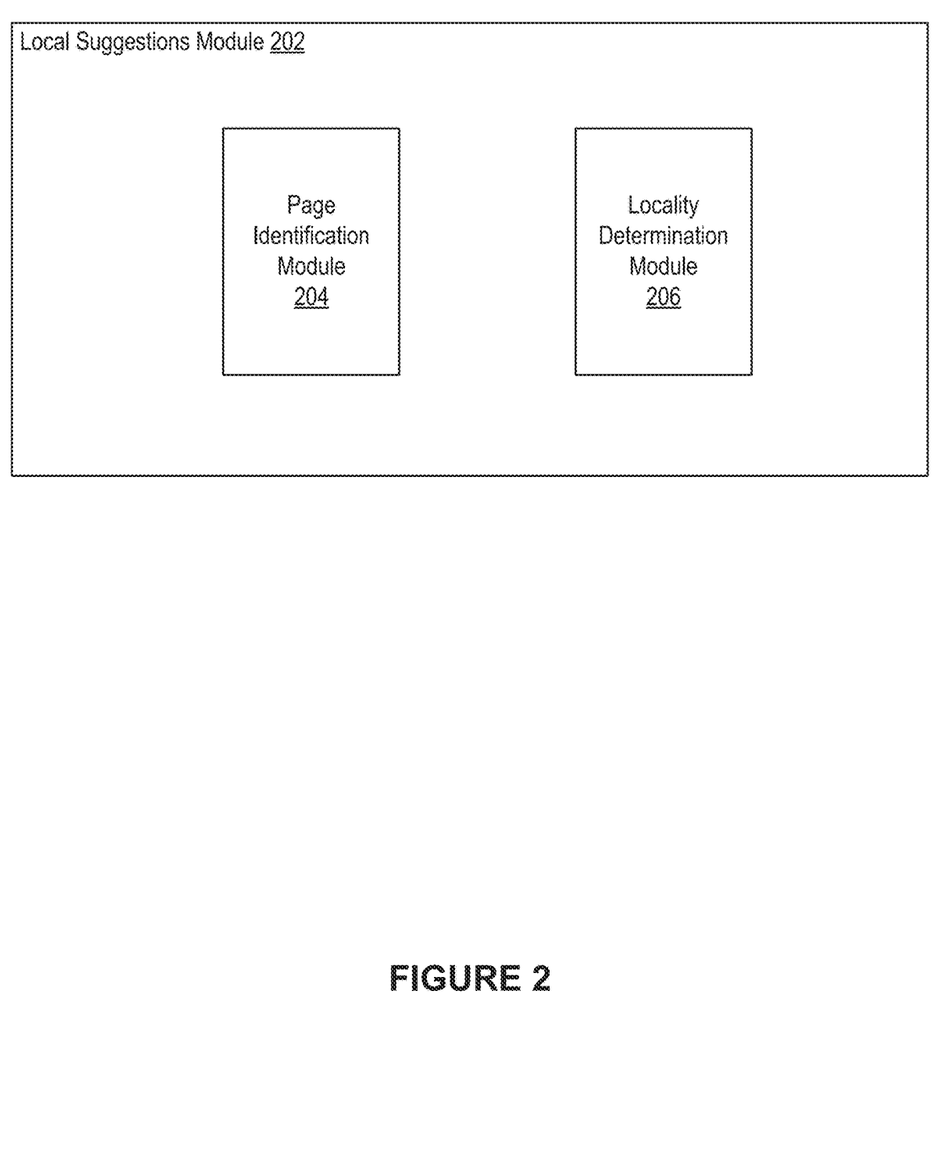
FIG. 2 illustrates an example local suggestions module, according to an embodiment of the present technology.

FIG. 2 illustrates an example local suggestions module 202, according to an embodiment of the present technology. In some embodiments, the local suggestions module 106 of FIG. 1 can be implemented with the local suggestions module 202. The local suggestions module 202 can include a page identification module 204 and a locality determination module 206.

The page identification module 204 can determine important pages of a social networking system associated with a metropolitan area. In some embodiments, the pages can be determined based on a tf-idf technique. For each metropolitan area, all cities in the metropolitan area are determined. Based on determination of the cities, users in each city in the metropolitan area can be determined and then all users in all of the cities in the metropolitan area can be determined. For each user in the metropolitan area, the page identification module 204 can determine all pages of a social networking system that have been liked by the user. All pages that have been liked by all users in the metropolitan area accordingly can be determined and a count of a number of likes for each page can be determined. In some embodiments, information relating to pages liked by users in a metropolitan area and counts of numbers of likes for each page can be maintained by the social networking system.

The tf-idf technique can be performed based on the information to determine important pages for each metropolitan area. In some embodiments, a tf-idf technique can be performed in which metropolitan areas can correspond to documents; pages of a social networking system that are liked (or fanned) by users in the metropolitan areas can correspond to terms in the documents; and, a number of users that like a page can correspond to frequency of terms. In some embodiments, a score for each page in a metropolitan area can be determined based on the tf-idf technique. A score for a page can be determined by the product of the following equations:

$$tf = k + \frac{(1-k)f}{m_f}, \quad (3)$$

where f is a number of likes by users in a metropolitan area for a page, $m_f$ is a maximum number of likes by users in a metropolitan area for a page over all pages in the metropolitan area, and k is a constant; and $$idf = \frac{\log_2(n)}{\log_2(n_p + 1)}, \quad (4)$$

where n is a number of metropolitan areas and $n_p$ is a number of metropolitan areas with users who liked a page. Pages can be sorted based on their scores. A threshold amount of pages having highest scores can be selected as pages constituting potential local suggestions for presentation to a user.

Equations (3) and (4) are based on a variety of considerations. First, $m_f$ accounts for a population scale and provides normalization. Based on $m_f$, popularity of a page in a metropolitan area, as reflected through likes by users, can be considered in relation to popularity of other pages (e.g., the most popular page) in the metropolitan area. Second, k relates to a ratio between the number of relatively small pages and the number of relatively large pages in the results. In some embodiments, a size of a page can be based on a number of likes by users of the page. As the value of k decreases, results based on the scores of the pages will contain more relatively large pages. A value of k can be selected to tune the ratio as desired. For example, if more relatively small pages than relatively large pages are desired as local suggestions, then the value of k can be appropriately adjusted to increase the ratio. In some implementations, k can be selected to have a value of 0.3, so that results contain mostly relatively small pages but still have a variety of relatively large pages. Other suitable or desired values of k are possible. Third, noise in the calculation of tf can be reduced. $n_p$ only counts metropolitan areas in which a number of users who like a page satisfies a selected threshold amount. Metropolitans areas in which a number of users who like a page does not satisfy the selected threshold amount are not counted in $n_p$. In some implementations, the selected threshold amount is a selected percentage of a maximum of a number of users that like a page over all metropolitan areas in the country. In one example, the selected percentage is ten percent.

The locality determination module 206 can optimize locality of pages constituting potential local suggestions for presentation to a user. For a city in a metropolitan area in which the user is located, each page constituting a potential local suggestion is mapped to the city. The locality determination module 206 can compute, for the city, a radius that extends from a center of the city and includes a selected percentage of users in the city. The selected percentage of users in the city can be any suitable value. In one implementation, the selected percentage of users included in the radius is 95% (i.e., p95 radius). In other implementations, other selected percentages can be used. In some embodiments, the center of the city can be computed based on an average latitude and an average longitude of respective locations of users in the city, as discussed herein. In addition, the locality determination module 206 can compute, for each page constituting a potential local suggestion, a radius that extends from a centroid of the page and includes a selected percentage of a fan distribution for the page. The selected percentage of fan distribution for the page can be any suitable value. In one implementation, the selected percentage of fan distribution included in the radius can be 50% (i.e., p50 radius). In other implementations, other selected percentages can be used. In some embodiments, a centroid for a page can be computed based on an average latitude and an average longitude of respective locations of users that have liked (or fanned) the page.

In some embodiments, the locality determination module 206 can apply one or more conditions (or rules) to determine whether a page constituting a potential suggestion should be removed from consideration (or filtered out) as a potential local suggestion. The conditions can ensure a desired degree or amount of locality of a page in relation to a city. If the conditions are satisfied, the page can remain a potential suggestion. If the conditions are not satisfied, the page can be removed as a potential suggestion. In some embodiments, a condition requires that a selected distance value between the city and a page is less than a selected distance metric. In some embodiments, the selected distance value between the city and a page can be a great circle distance. The selected distance metric can be based on a maximum value as between a constant value and a value of a radius of the city, as well as a value of a radius of the page. For example, in one implementation, a condition provides as follows:

$$\text{great\_circle\_distance}((\text{lat\_city}, \text{long\_city}), (\text{lat\_page}, \text{long\_page})) < \max(J, \text{city\_}p95) + \text{page\_}p50 \quad (5)$$

where latcity is an average latitude of a city, long_city is an average longitude of the city, lat_page is an average latitude of a page, long_page is an average longitude of the page, J is a constant, city_p95 is a radius from a center of the city including 95% of users in the city, and page_p50 is a radius from a centroid of the page including 50% of the fan distribution of the page. In some embodiments, average latitude and average longitude of a city and average latitude and average longitude of a page can be determined in a manner as set forth herein. In some embodiments, a value of J can be adjusted to vary a degree or amount of locality of a page in relation to a city. In one implementation, the value of J is 30. In other implementations, other values of J can be used.

After pages that satisfy the one or more conditions to ensure a desired degree or amount of locality of pages in relation to a city are determined, the pages, or references to the pages, can be provided to a user as local suggestions. In some embodiments, a reference to a page in the form of a link can be provided by the social networking system to the user to allow a user to navigate to the page upon selection of the link. The social networking system can present the local suggestions to the user in a variety of manners. For example, the local suggestions can be presented as content items in a feed of content items associated with the user. As another example, the local suggestions can be presented in direct communications (e.g., notifications, email, etc.) addressed to the user. Many variations are possible.

Figure 3:
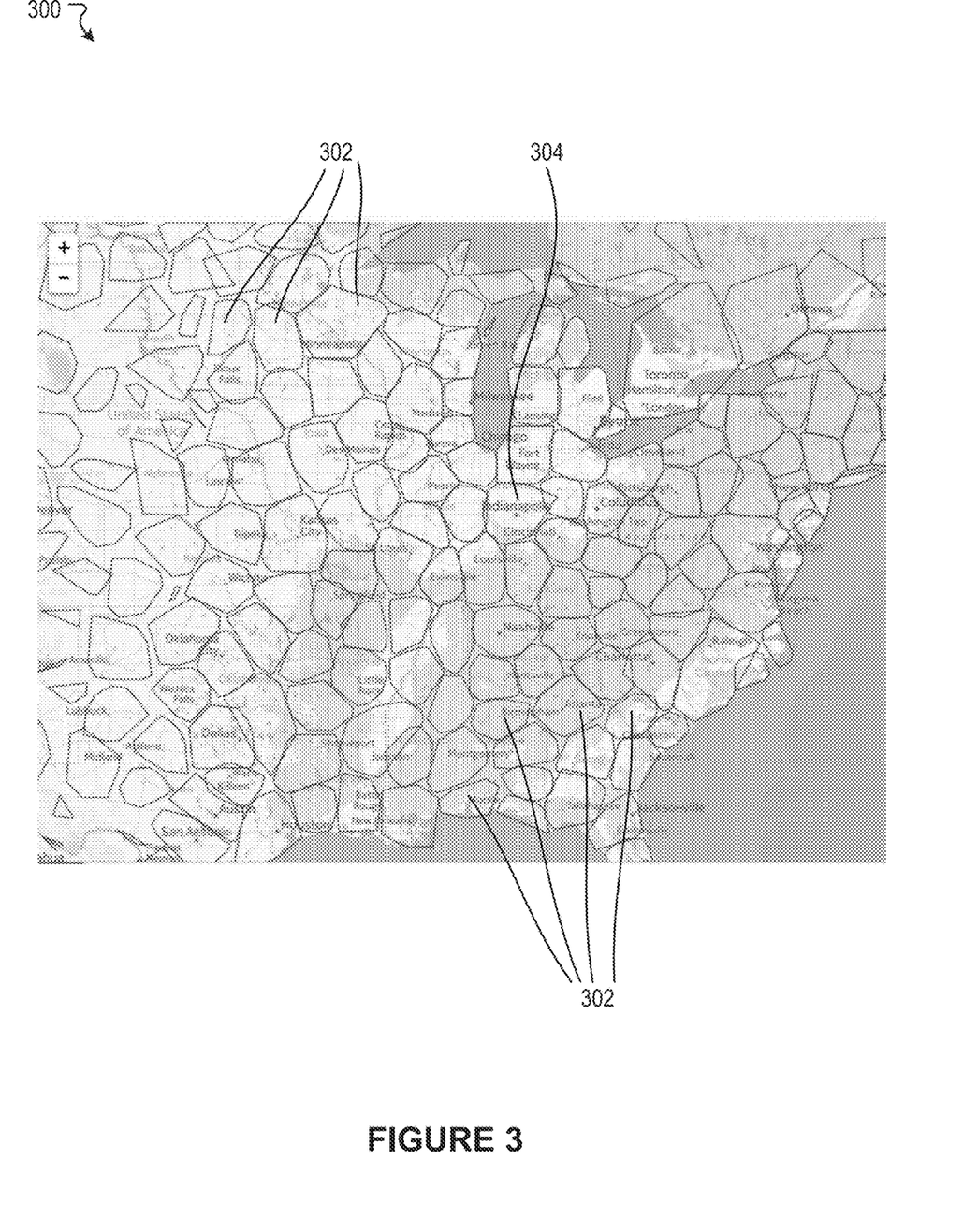
FIG. 3 illustrates an example diagram of clusters, according to an embodiment of the present technology.

FIG. 3 illustrates an example diagram 300 of clusters constituting metropolitan areas 302, according to an embodiment of the present technology. To generate the metropolitan areas 302, a similarity graph is generated in which cities are linked through connections based on satisfaction of one or more conditions, and weights are computed for the connections, as described in more detail herein. The similarity graph can be partitioned by country. As shown, the diagram 300 reflects a partition of the similarity graph relating to a particular country (i.e., USA). A spectral clustering technique can be applied to the partition of the similarity graph to generate clusters of cities. The clusters of cities constitute the metropolitan areas 302. In some cases, a metropolitan area can be labeled with a name of a biggest city within the metropolitan area. For example, a cluster of cities relating to a metropolitan area 304 contains a biggest city, Indianapolis.

Based on the determination of the metropolitan areas 302, pages can be provided as local suggestions to a user associated with a city in a metropolitan area. In some embodiments, the user associated with a city can be a user that was, is, or will be located in the city. In some embodiments, the user associated with a city can be a user that has interest in the city. A technique can be applied to identify relevant or important pages relating to the metropolitan area as potential local suggestions for the user. In some embodiments, the technique can include a tf-idf technique, as described in more detail herein. Post-filtering of identified pages relating to the metropolitan area can be performed based on satisfaction of one or more conditions to ensure a desired level of locality of a page in relation to the city. Resulting local pages, or references to the pages, can be provided as local suggestions to the user.

Figure 4:
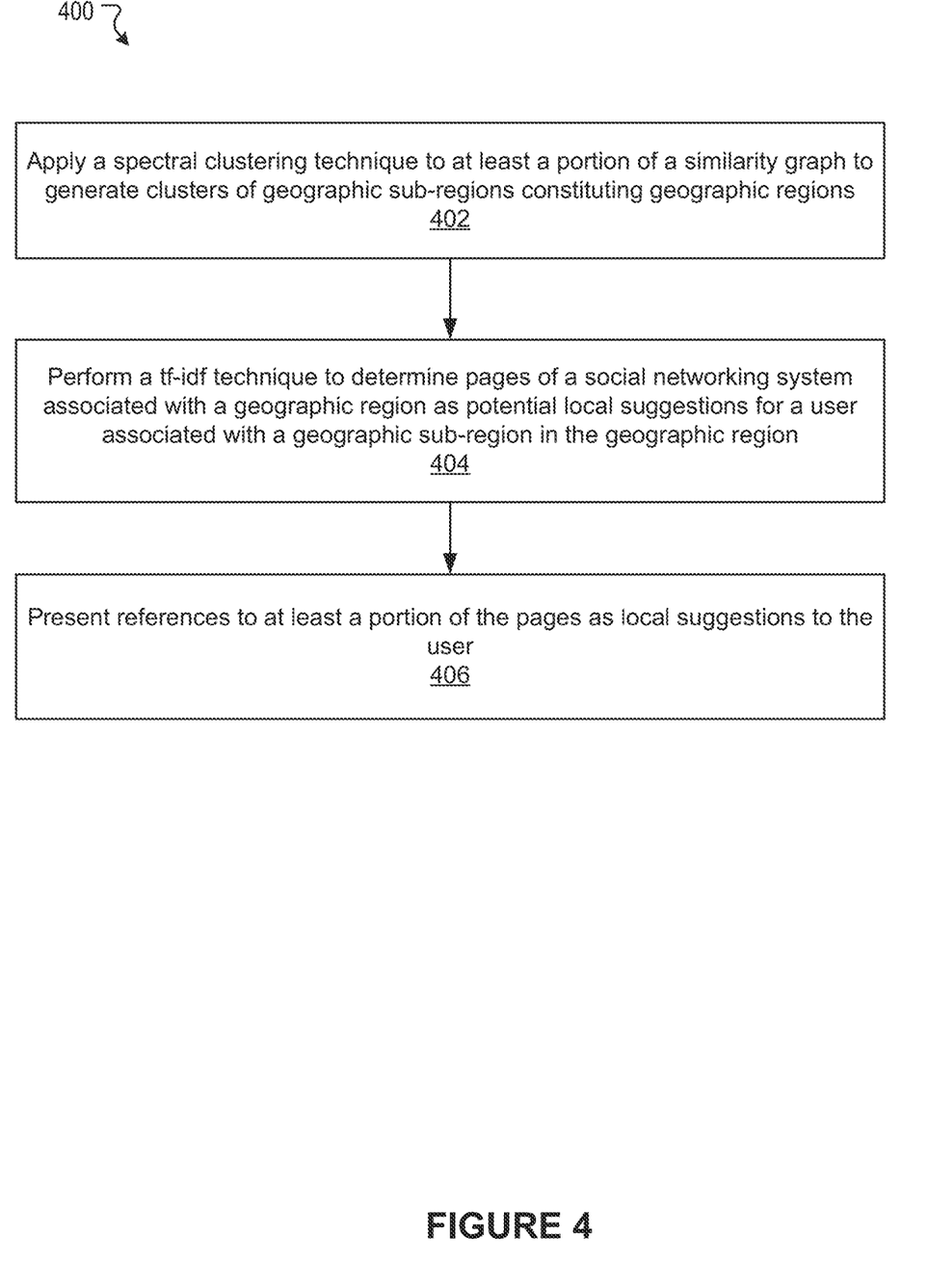
FIG. 4 illustrates an example method for determining pages as local suggestions, according to an embodiment of the present technology.

FIG. 4 illustrates an example method 400 to determine pages as local suggestions, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can apply a spectral clustering technique to at least a portion of a similarity graph to generate clusters of geographic sub-regions constituting geographic regions. At block 404, the method 400 can perform a tf-idf technique to determine pages of a social networking system associated with a geographic region as potential local suggestions for a user associated with a geographic sub-region in the geographic region. At block 406, the method 400 can present references to at least a portion of the pages as local suggestions to the user. Other suitable techniques that incorporate various features and embodiments of the present technology are possible.

Figure 5:
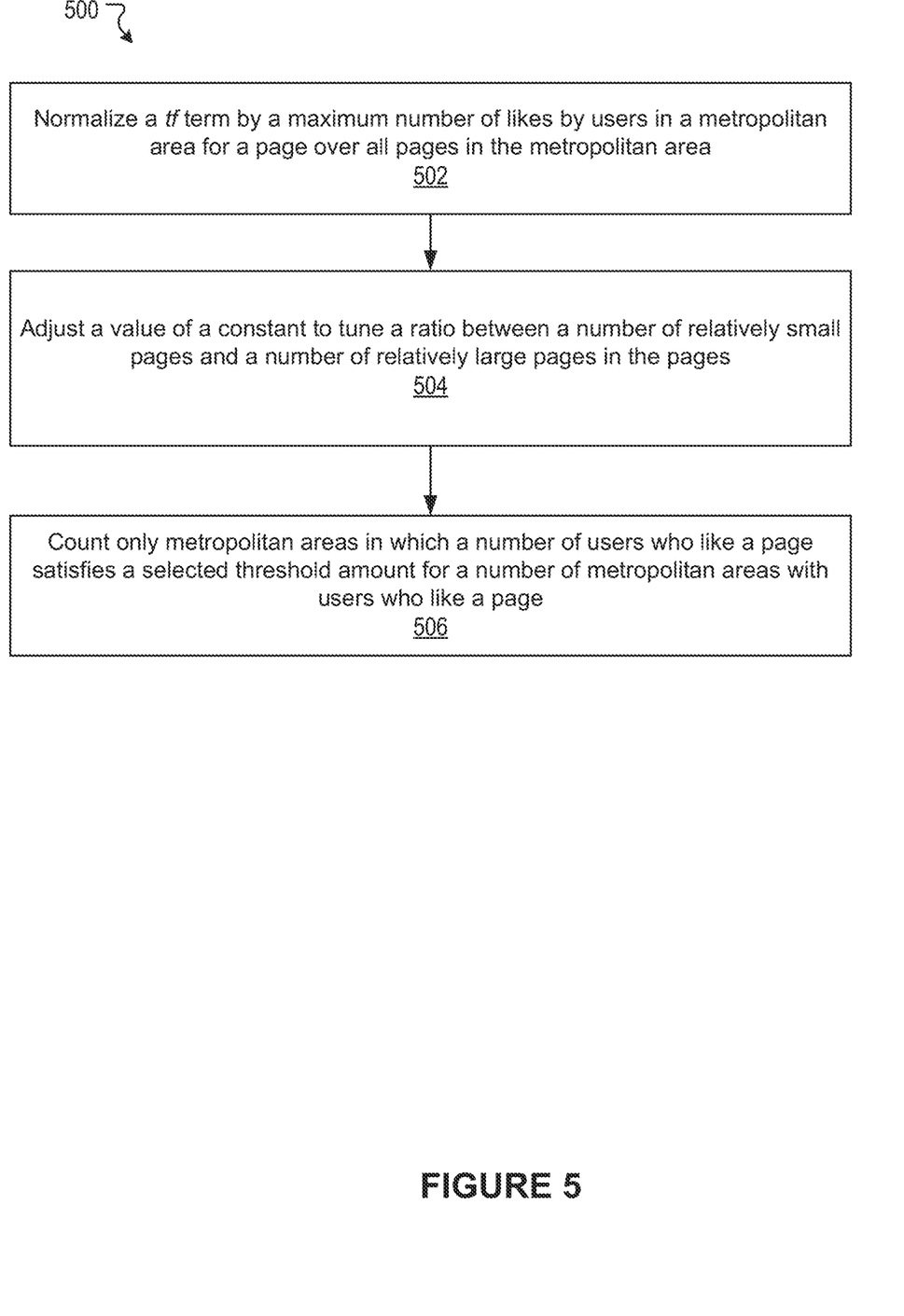
FIG. 5 illustrate an example method for performing a tf-idf technique, according to an embodiment of the present technology.

FIG. 5 illustrates a first example method 500 to perform a tf-idf technique, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can normalize a tf term by $m_f$, where $m_f$ is a maximum number of likes by users in a metropolitan area for a page over all pages in the metropolitan area. At block 504, the method 500 can adjust a value of a constant k to tune a ratio between a number of relatively small pages and a number of relatively large pages in the pages. At block 506, the method 500 can count only metropolitan areas in which a number of users who like a page satisfies a selected threshold amount for $n_p$, where $n_p$ is a number of metropolitan areas with users who like a page. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
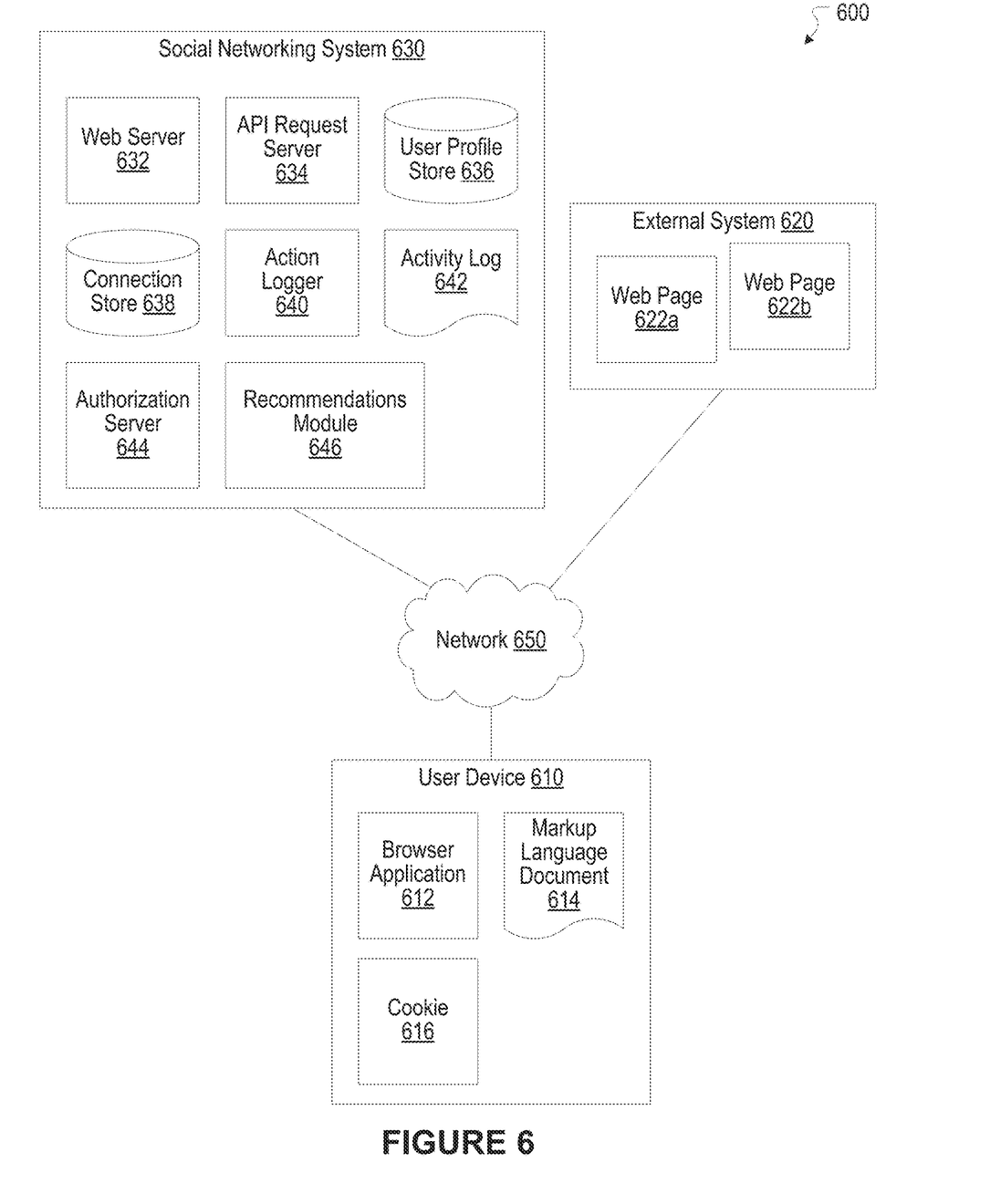
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a recommendations module 646. The recommendations module 646 can be implemented with the recommendations module 102, as discussed in more detail herein. In some embodiments, one or more functionalities of the recommendations module 646 can be implemented in the user device 610.

Hardware Implementation

Figure 7:
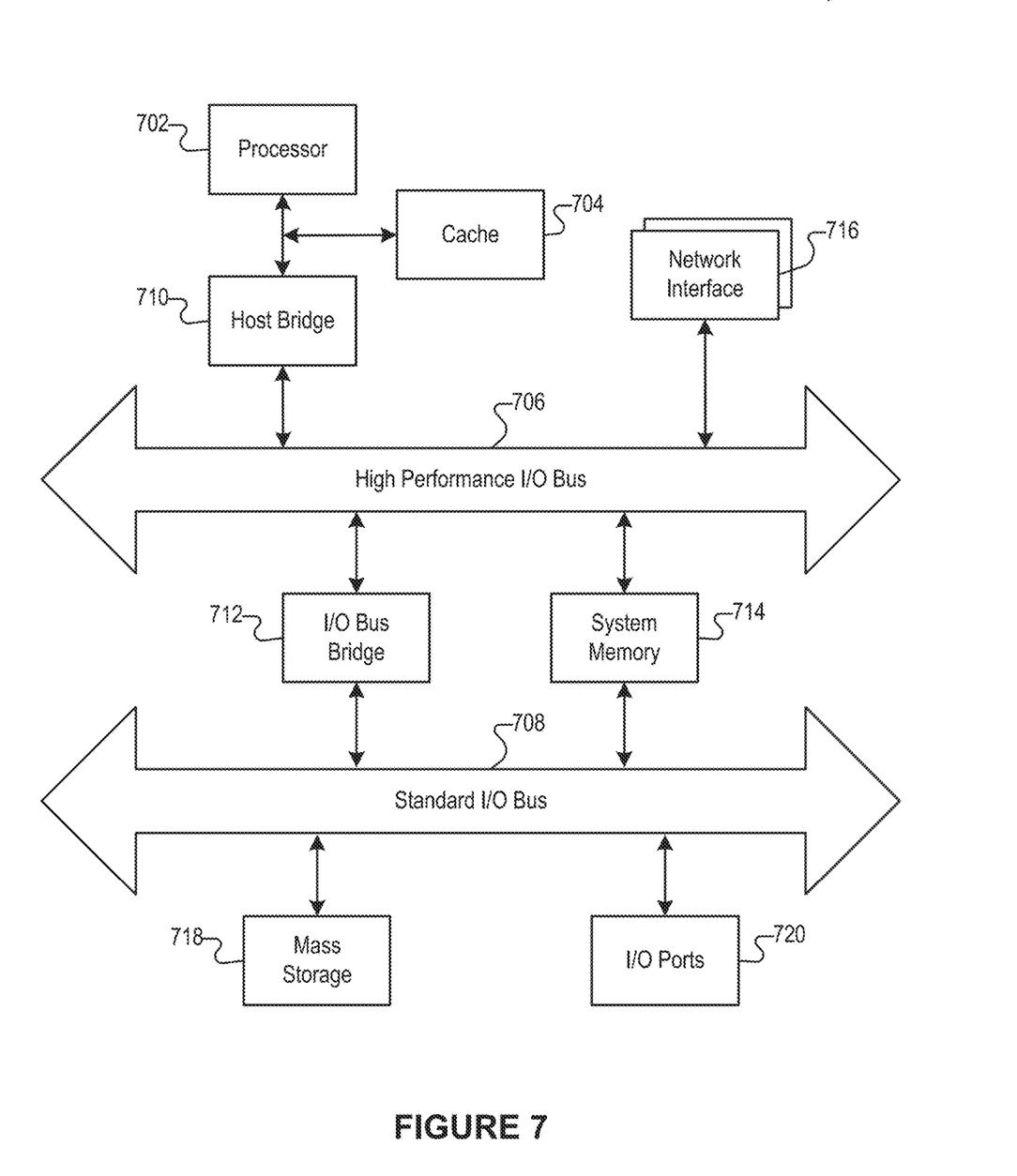
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   applying, by a computing system, a spectral clustering technique to at least a portion of a similarity graph to generate clusters of geogra phic sub-regions constituting geographic regions in a geogra phic area, wherein two geogra phic sub-regions, represented as vertices in the similarity graph, are linked through a connection in the similarity graph based on a condition relating to whether the two geographic sub-regions are within a selected number of nea rest cities of one another, wherein the geographic sub-regions are cities, wherein the connection is weighted based on a product of a first factor and a second factor, the first factor associated with a distance between the two geographic sub-regions and the second factor associated with check-ins by users in the two geographic sub-regions;
   performing, by the computing system, a tf-idf technique to determine pages associated with a geographic region as potential local suggestions for a user associated with a geographic sub-region in the geographic region; and
   presenting, by the computing system, references to at least a portion of the pages as local suggestions to the user.

2. The computer-implemented method of claim 1, wherein the geographic regions are metropolitan areas including the cities.

3. The computer-implemented method of claim 1, wherein the applying the spectral clustering technique comprises:
   determining a first list of a selected number of cities nearest to a first city;
   determining a second list of the selected number of cities nearest to a second city; and
   determining satisfaction of the condition based on the second city appearing in the first list and the first city appearing in the second list.

4. The computer-implemented method of claim 1, further comprising:
   partitioning the similarity graph by country.

5. The computer-implemented method of claim 1, wherein the geographic regions correspond to documents, pages relating to a geographic region correspond to terms in a document, and a number of users who like a page correspond to term frequency in the tf-idf technique.

6. The computer-implemented method of claim 1, wherein the performing a tf-idf technique comprises:
   normalizing a tf term by $m_f$, where $m_f$ is a maximum number of likes by users in a metropolitan area for a page over all pages in the metropolitan area.

7. The computer-implemented method of claim 1, wherein the performing a tf-idf technique comprises:
   adjusting a value of a constant k to tune a ratio between a number of relatively small pages and a number of relatively large pages in the pages.

8. The computer-implemented method of claim 1, wherein the performing a tf-idf technique comprises:
counting only metropolitan areas in which a number of users who like a page satisfies a selected threshold amount for $n_p$, where $n_p$ is a number of metropolitan areas with users who like a page.

9. The computer-implemented method of claim 1, further comprising:
applying to the pages a second condition relating to a desired degree of locality of a page in relation to a city to determine the at least a portion of the pages for which the references are presented as local suggestions to the user.

10. The computer-implemented method of claim 9, wherein the second condition is associated with a distance based on latitude and longitude values of the city and the page being less than a threshold based on a selected radius from a center of the city and a selected radius from a centroid of the page.

11. A system comprising:
at least one processor; and
a memory storing instructions that, when executed by the at least one processor, cause the system to perform:
applying a spectral clustering technique to at least a portion of a similarity graph to generate clusters of geographic sub-regions constituting geographic regions in a geographic area, wherein two geographic sub-regions, represented as vertices in the similarity graph, are linked through a connection in the similarity graph based on a condition relating to whether the two geographic sub-regions are within a selected number of nearest cities of one another, wherein the geographic sub-regions are cities, wherein the connection is weighted based on a product of a first factor and a second factor, the first factor associated with a distance between the two geographic sub-regions and the second factor associated with check-ins by users in the two geographic sub-regions;
performing a tf-idf technique to determine pages associated with a geographic region as potential local suggestions for a user associated with a geographic sub-region in the geographic region; and
presenting references to at least a portion of the pages as local suggestions to the user.

12. The system of claim 11, wherein the geographic sub-regions are cities and the geographic regions are metropolitan areas including the cities.

13. The system of claim 11, further comprising:
partitioning the similarity graph by country.

14. The system of claim 11, wherein the geographic regions correspond to documents, pages relating to a geographic region correspond to terms in a document, and a number of users who like a page correspond to term frequency in the tf-idf technique.

15. The system of claim 11, further comprising:
applying to the pages at least one condition relating to a desired degree of locality of a page in relation to a city to determine the at least a portion of the pages for which the references are presented as local suggestions to the user.

16. A non-transitory computer-readable storage medium including instructions that, when executed by at least one processor of a computing system, cause the computing system to perform a method comprising:
applying a spectral clustering technique to at least a portion of a similarity graph to generate clusters of geographic sub-regions constituting geographic regions in a geographic area, wherein two geographic sub-regions, represented as vertices in the similarity graph, are linked through a connection in the similarity graph based on a condition relating to whether the two geographic sub-regions are within a selected number of nearest cities of one another, wherein the geographic sub-regions are cities, wherein the connection is weighted based on a product of a first factor and a second factor, the first factor associated with a distance between the two geographic sub-regions and the second factor associated with check-ins by users in the two geographic sub-regions;
performing a tf-idf technique to determine pages associated with a geographic region as potential local suggestions for a user associated with a geographic sub-region in the geographic region; and
presenting references to at least a portion of the pages as local suggestions to the user.

17. The non-transitory computer-readable storage medium of claim 16, wherein the geographic sub-regions are cities and the geographic regions are metropolitan areas including the cities.

18. The non-transitory computer-readable storage medium of claim 16, further comprising:
partitioning the similarity graph by country.

19. The non-transitory computer-readable storage medium of claim 16, wherein the geographic regions correspond to documents, pages relating to a geographic region correspond to terms in a document, and a number of users who like a page correspond to term frequency in the tf-idf technique.

20. The non-transitory computer-readable storage medium of claim 16, further comprising:
applying to the pages at least one condition relating to a desired degree of locality of a page in relation to a city to determine the at least a portion of the pages for which the references are presented as local suggestions to the user.

* * * * *